(12) United States Patent
Wakabayashi et al.

(10) Patent No.: US 12,368,207 B2
(45) Date of Patent: Jul. 22, 2025

(54) BATTERY PACK

(71) Applicant: SANYO Electric Co., Ltd., Daito (JP)

(72) Inventors: Takeaki Wakabayashi, Hyogo (JP); Kensaku Takeda, Tokushima (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 759 days.

(21) Appl. No.: 17/634,504

(22) PCT Filed: Sep. 8, 2020

(86) PCT No.: PCT/JP2020/033863
§ 371 (c)(1),
(2) Date: Feb. 10, 2022

(87) PCT Pub. No.: WO2021/065368
PCT Pub. Date: Apr. 8, 2021

(65) Prior Publication Data
US 2022/0294067 A1    Sep. 15, 2022

(30) Foreign Application Priority Data

Sep. 30, 2019 (JP) ................................. 2019-179349

(51) Int. Cl.
*H01M 50/284* (2021.01)
*H01M 50/213* (2021.01)
*H01M 50/247* (2021.01)

(52) U.S. Cl.
CPC ....... *H01M 50/284* (2021.01); *H01M 50/213* (2021.01); *H01M 50/247* (2021.01); *H01M 2220/30* (2013.01)

(58) Field of Classification Search
CPC ............. H01M 50/284; H01M 50/247; H01M 50/213; H01M 50/20; H01M 50/244; H01M 50/289; H01M 50/291
See application file for complete search history.

(56) References Cited

U.S. PATENT DOCUMENTS

2006/0228610 A1    10/2006  Shu et al.
2011/0189509 A1    8/2011   Kang et al.

FOREIGN PATENT DOCUMENTS

CN    207783385 U    8/2018
JP    8-212992 A     8/1996
(Continued)

OTHER PUBLICATIONS

International Search Report dated Nov. 17, 2020, issued in counterpart International Application No. PCT/JP2020/033863. (2 pages).
(Continued)

*Primary Examiner* — Keith Walker
*Assistant Examiner* — Steven S Ha
(74) *Attorney, Agent, or Firm* — WHDA, LLP (57) ABSTRACT

In the battery pack, a circuit board is attached to a battery holder accommodating therein batteries. A first locking portion is provided at each of slidable side edges on both sides of the circuit board parallel to each other. An insertion guide for the circuit board is provided in the battery holder. A pair of elastic extensions slenderly extended include second locking portions to be locked to first locking portions are arranged on both sides of the circuit board to be inserted into an insertion guide. The circuit board is inserted into the insertion guide of the battery holder. The second locking portions are locked by the first locking portions. The circuit board is held at a predetermined position on battery holder.

16 Claims, 9 Drawing Sheets

(56) References Cited

FOREIGN PATENT DOCUMENTS

| | | |
|---|---|---|
| JP | 2010-146774 A | 7/2010 |
| JP | 2010-225339 A | 10/2010 |
| JP | 2011-103258 A | 5/2011 |
| JP | 2011-249251 A | 12/2011 |
| JP | 2016-136462 A | 7/2016 |
| WO | 2012/077404 A1 | 6/2012 |
| WO | 2015/129078 A1 | 9/2015 |

OTHER PUBLICATIONS

Extended Supplementary European Search Report dated Jun. 27, 2024, issued in counterpart Application No. 20871857.7. (10 pages).

BATTERY PACK

TECHNICAL FIELD

The present invention relates to a battery pack including a circuit board connected to a battery, and particularly relates to a battery pack adopted to a power source of a cordless device.

BACKGROUND ART

A battery pack has been developed in which a circuit board, on which a control circuit that controls charging and discharging of a battery is mounted, is fixed to a battery holder in which a plurality of batteries is arranged at predetermined positions. As a battery pack having this structure, a coupling structure in which a circuit board can be inserted into a battery holder and arranged at a predetermined position has been developed (PTL 1).

In the battery pack described above, the battery holder is provided with a guide groove into which the circuit board is inserted. Furthermore, the battery holder is provided by integrally molding an elastic locking piece that holds the circuit board inserted into a guide rib so as not to be pulled off. The elastic locking piece is arranged to elastically protrude in the guide groove into which the circuit board is inserted, and the circuit board is provided with a locking recess that guides the elastic locking piece. In the battery pack having this structure, the circuit board is inserted into the guide groove of the battery holder, and the elastic locking piece is made to elastically protrude into the locking recess of the sub-circuit board, thereby arranging the circuit board in the guide groove so as not to be pulled off. The battery pack can be arranged at a predetermined position of the battery holder so as not to be pulled off by inserting the circuit board into the guide groove of the battery holder.

CITATION LIST

Patent Literature

PTL 1: Japanese Patent Laid-Open Publication No. 2010-146774

SUMMARY

Technical Problem

In the battery pack described above, the circuit board is easily coupled to the battery holder, and the assembling process is simplified. However, in this battery pack, since the elastic locking piece elastically protruding into the guide groove is pushed out into the locking recess of the circuit board to arrange the circuit board at a predetermined position, it is difficult to achieve an excellent vibration resistance property, and the circuit board or a circuit board coupling portion of the battery holder may be damaged by vibration or impact.

The present invention has been developed in order to further solve the above disadvantages, and it is an object of the present invention to provide a battery pack capable of achieving an excellent vibration resistance property while being simply, easily and efficiently produced in a large amount.

Solution to Problem

A battery pack includes a battery holder including a plurality of batteries arranged at predetermined positions, and a circuit board connected to the plurality of batteries and arranged at a predetermined position on the battery holder. The circuit board has a plate shape having slidable side edges parallel to each other at both sides of the circuit board. Each of the slidable side edges of the circuit board includes a first locking portion. The battery holder includes insertion guides allowing the circuit board to move along the slidable side edges of the circuit board, and a pair of elastic extensions slenderly extended and disposed on the both sides of the circuit board inserted into the insertion guides. Each of the elastic extensions includes a second locking portion, the second locking portion is locked by respective one of the first locking portions so as to lock the circuit board at the predetermined position. One of the respective one of the first locking portions and the each of the second locking portions is a locking recess, and another of the respective one of the first locking portions and the each of the second locking portions is a locking protrusion. The respective one of the first locking portions locks the each of the second locking portions to hold the circuit board at the predetermined position on the battery holder while the circuit board is inserted into the insertion guide.

Advantageous Effect of Invention

The battery pack described above has an excellent vibration resistance property while being easily and efficiently produced in a large amount.

DESCRIPTION OF EMBODIMENTS

Hereinafter, the present invention will be described in detail with reference to the drawings. Note that, in the following description, terms (for example, "top", "bottom", and other terms including those terms) indicating specific directions or positions are used as necessary; however, the use of those terms is for facilitating the understanding of the invention with reference to the drawings, and the technical scope of the present invention is not limited by the meanings of the terms. Parts denoted by the same reference numerals in a plurality of drawings indicate the identical or equivalent parts or members.

Exemplary embodiments described below illustrate specific examples of the technical idea of the present invention, and the present invention is not limited to the following exemplary embodiments. In addition, unless otherwise specified, dimensions, materials, shapes, relative arrangements, and the like of the constituent elements described below are not intended to limit the scope of the present invention, but are intended to be illustrative. Further, the contents described in one exemplary embodiment and one working example are also applicable to other exemplary embodiments and working examples. The sizes, positional relationships, and the like of members illustrated in the drawings may be exaggerated in order to clarify description.

A battery pack of a first exemplary embodiment of the present invention includes: a battery holder including a plurality of batteries arranged at predetermined positions; and a circuit board connected to the plurality of batteries and arranged at a predetermined position on the battery holder. The circuit board has a plate shape having slidable side edges parallel to each other at both sides of the circuit board. Each of the slidable side edges of the circuit board includes a first locking portion. The battery holder includes: insertion guides allowing the circuit board to move along the slidable side edges of the circuit board; and a pair of elastic extensions slenderly extended and disposed on the both sides of the circuit board inserted into the insertion guides. Each of the elastic extensions includes a second locking portion, the second locking portion is locked by respective one of the first locking portions so as to lock the circuit board at the predetermined position. One of the respective one of the first locking portions and the each of the second locking portions is a locking recess, and another of the respective one of the first locking portions and the each of the second locking portions is a locking protrusion. The respective one of the first locking portions locks the each of the second locking portions to hold the circuit board at the predetermined position on the battery holder while the circuit board is inserted into the insertion guide.

The battery pack described above has a feature that the circuit board is easily set at a predetermined position to enable efficient production in a large amount, and further, an excellent vibration resistance property is achieved. This is because, in the battery pack described above, the first locking portion is provided at the slidable side edges at the both sides of the circuit board, the battery holder is provided with an insertion guide into which the circuit board is inserted, the insertion guide is provided with elastic extensions having a second locking portion in an integrated structure, and both sides of the circuit board are elastically sandwiched and held by the pair of elastic extensions while the circuit board is inserted into the battery holder.

A battery pack of a second exemplary embodiment of the present invention may have a structure in which the each of the elastic extensions has an elongated shape slenderly extended in an insertion direction of the circuit board, both ends of the each of the elastic extensions are coupled to the battery holder, and the each of the elastic extensions has the respective one of the first locking portions at an intermediate portion of the each of the elastic extensions.

A battery pack of a third exemplary embodiment of the present invention may have a structure in which the battery holder has two slits therein extended parallel to each other, and the each of the elastic extensions is provided between the two slits, in other words, a shape in which the slits are provided on both sides of the elastic extension. This battery pack has a feature that the battery holder provided with the elastic extensions is efficiently produced in a large amount with a simple mold, so as to reduce the production cost. Furthermore, the structure in which the elastic extensions are unitarily molded with the battery holder provides excellent durability. Further, there is also a feature that the slits efficiently dissipate heat by exposing the surface of the cylindrical battery arranged inside.

In a battery pack of a fourth exemplary embodiment of the present invention, the respective one of the first locking portions is the locking recess, the each of the second locking portions is the locking protrusion, and the locking protrusion has an inclined surface such that a portion of the inclined surface approaches the slidable side edges of the circuit board as the portion of the inclined surface shifts in the insertion direction of the circuit board. This battery pack has a feature that the circuit board is smoothly inserted into a predetermined position of the battery holder and reliably arranged at the predetermined position.

In a battery pack of a fifth exemplary embodiment of the present invention, the locking recess and the locking protrusion may have respective surfaces contacting each other in a pull-out direction of the circuit board. The respective surfaces of the locking recess and the locking protrusion are perpendicular to the pull-out direction. The battery pack holds the circuit board inserted at the predetermined position on the battery holder so as not to be pulled off from the predetermined position by the abutting vertical surface.

In a battery pack of a sixth exemplary embodiment of the present invention, the plurality of batteries may be cylindrical batteries. The battery holder includes a corrugated surface plate allowing the cylindrical batteries to arranged parallel to one another in a single plane. The circuit board is arranged on an outer surface of the corrugated surface plate. This battery pack has a feature that the cylindrical batteries are arranged on the same plane and a large circuit board is arranged on the battery holder. The circuit board with a large size has a feature that heat generated by a mounted component can be efficiently dissipated, and moreover, mounting density can be lowered, and a stable operation can be performed for a long period of time.

In a battery pack of a seventh exemplary embodiment of the present invention, the elastic extensions may be coupled unitarily to the corrugated surface plate. In this battery pack, the elastic extension and the battery holder are reliably and stably coupled to each other, so that the vibration resistance property can be further improved.

In a battery pack of an eighth exemplary embodiment of the present invention, the corrugated surface plate includes rounded ridges protruding on the outer surface of the corrugated surface plate. Each of the pair of elastic extensions disposed at the both sides of the circuit board are arranged along a peak portions of respective one of the rounded ridges different from each other. The circuit board is arranged at a position covering a valley portion between the rounded ridges. In this battery pack, a wide space is provided between the circuit board and the battery holder by the valley portion, and thus there is a feature that a circuit board having a protruding portion on the back surface can also be arranged in the battery holder.

In a battery pack of a ninth exemplary embodiment of the present invention, the each of the elastic extensions is arranged along the peak portions of the respective one of the rounded ridges of the corrugated surface plate. The corrugated surface plate has slits provided therein. The slits are provided at both sides of the each of the elastic extensions. This battery pack has a feature that the surface of the cylindrical battery may be exposed from the slits provided in the peak portion of the rounded ridge to efficiently dissipate heat.

A battery pack of a tenth exemplary embodiment of the present invention can be used as a power source configured to be attached to an electric device equipped with a motor. A battery pack of an eleventh exemplary embodiment of the present invention can be used as a power source configured to be attached to a vacuum cleaner. A battery pack of a twelfth exemplary embodiment of the present invention can be configured to be attached to a self-traveling vacuum cleaner and used as a power source. Such a battery pack has a feature that it can be used for a long period of time by preventing adverse effects due to vibration of a rotating motor.

Exemplary Embodiment 1

Figure 1:
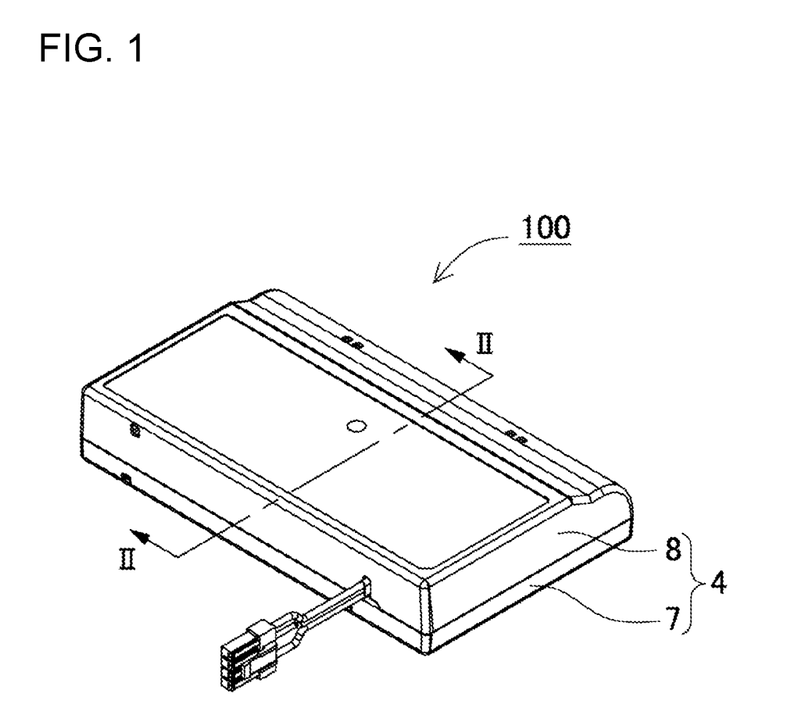
FIG. 1 is a perspective view of a battery pack according to an exemplary embodiment of the present invention.

FIG. 1 illustrates a battery pack used for a power source configured to be attached to an electric device equipped with a motor, for example, a vacuum cleaner, particularly a vacuum cleaner that self-travels in a room. An electric device equipped with a motor, such as a vacuum cleaner, receives vibration by a rotating motor, and therefore a vibration resistance property is important. However, since an electric device with a battery pack as a power source is cordless without a power cord connected thereto and is not an installation type, the battery pack is required to have a vibration resistance property to resist impact when dropped. Therefore, in the present invention, the application of the battery pack is not limited to an electric device, such as a vacuum cleaner, equipped with a motor, and the battery pack can be used for all other electric devices with a battery as a power source.

Battery pack 100 illustrated in FIGS. 1 to 9 includes battery holder 2 in which batteries 1 are s disposed at predetermined positions, and circuit board 3 coupled to battery holder 2. In battery pack 100 of FIGS. 1 to 4, circuit board 3 is coupled to battery holder 2 coupling batteries 1 to form battery block 10. Battery block 10 is accommodated in exterior case 4. In illustrated battery pack 100, a part of battery holder 2 is also used for exterior case 4.

Battery Block 10

In illustrated battery pack 100, two battery blocks 10 are coupled in series. In illustrated battery holder 2, four cylindrical batteries 1A are arranged parallel to one another on a single plane. Each of two battery blocks 10 couples end surfaces of battery holder 2 to each other in a form of linearly arranging cylindrical batteries 1A to be accommodated. In two coupled battery blocks 10, circuit board 3 is coupled to a surface of battery holder 2. Circuit board 3 is disposed on surfaces of two linearly coupled battery holders 2, and is connected to both battery blocks 10 via lead plate 5. In battery pack 100, the number of batteries 1 accommodated in battery holder 2 can be increased, or the number of battery blocks 10 to be coupled to one another can be increased to increase an output voltage or charge-discharge capacity. Therefore, the number of batteries 1 accommodated in battery holder 2 and the number of battery blocks 10 coupled in series to one anther are adjusted in consideration of an output voltage and a charge-discharge capacity required for a cordless device to be attached to.

Battery 1

Battery holder 2 in the drawings accommodates therein battery 1 as cylindrical battery 1A of a lithium ion battery in battery holder 2. Battery pack 100 in which battery 1 is the lithium ion battery can have a large output with respect to the volume and weight. However, instead of the lithium ion battery, a lithium polymer battery or a nickel-hydrogen battery can also be used as the battery. Therefore, the present invention does not specify the battery as the lithium ion battery. As the battery, all chargeable batteries can be used. Further, in battery pack 100 in the drawings, battery 1 is cylindrical battery 1A, but a rectangular battery may also be used as the battery.

Battery Holder 2

Figure 2:
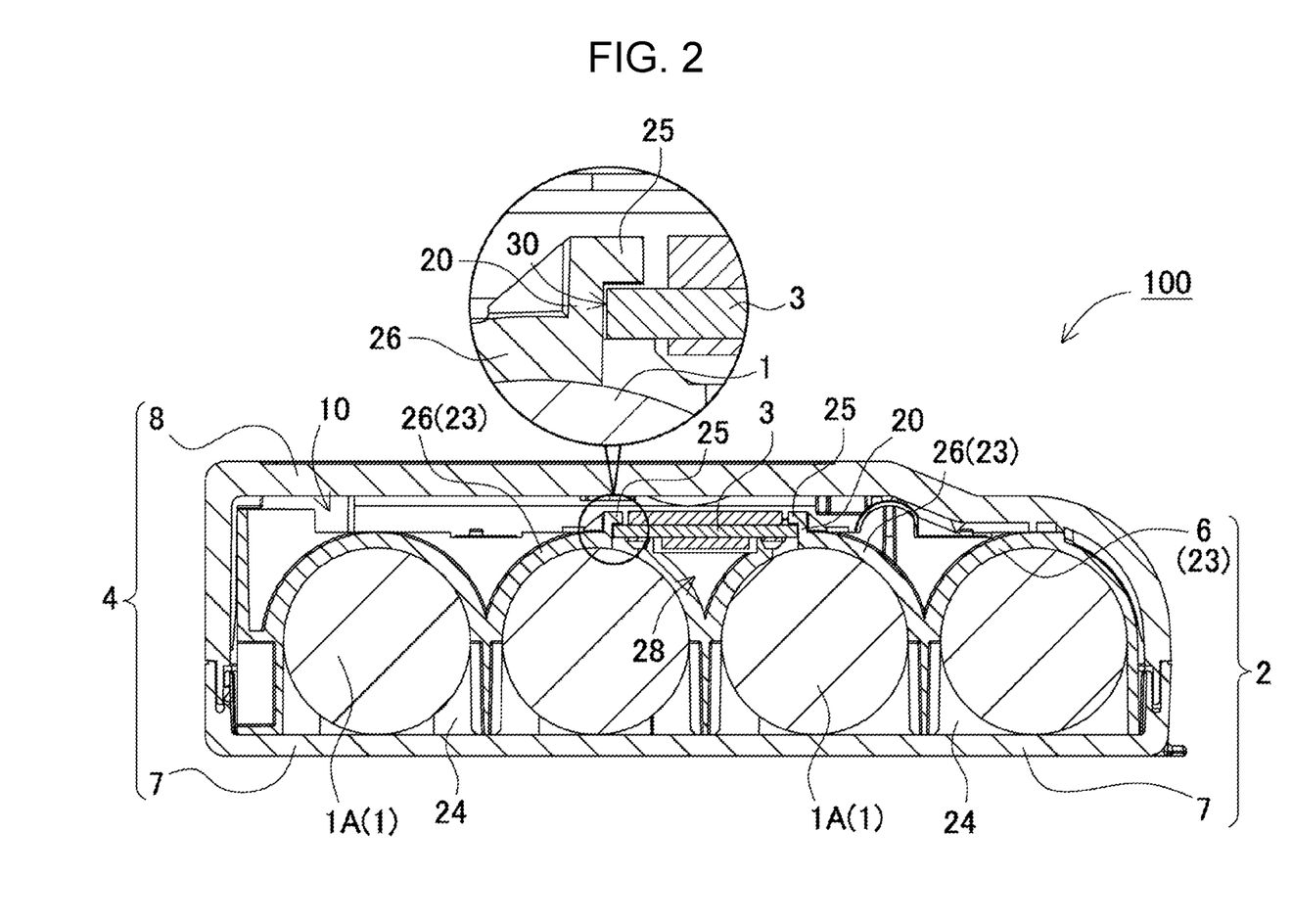
FIG. 2 is a cross-sectional view of the battery pack illustrated in FIG. 1 taken along line II-II.
Figure 3:
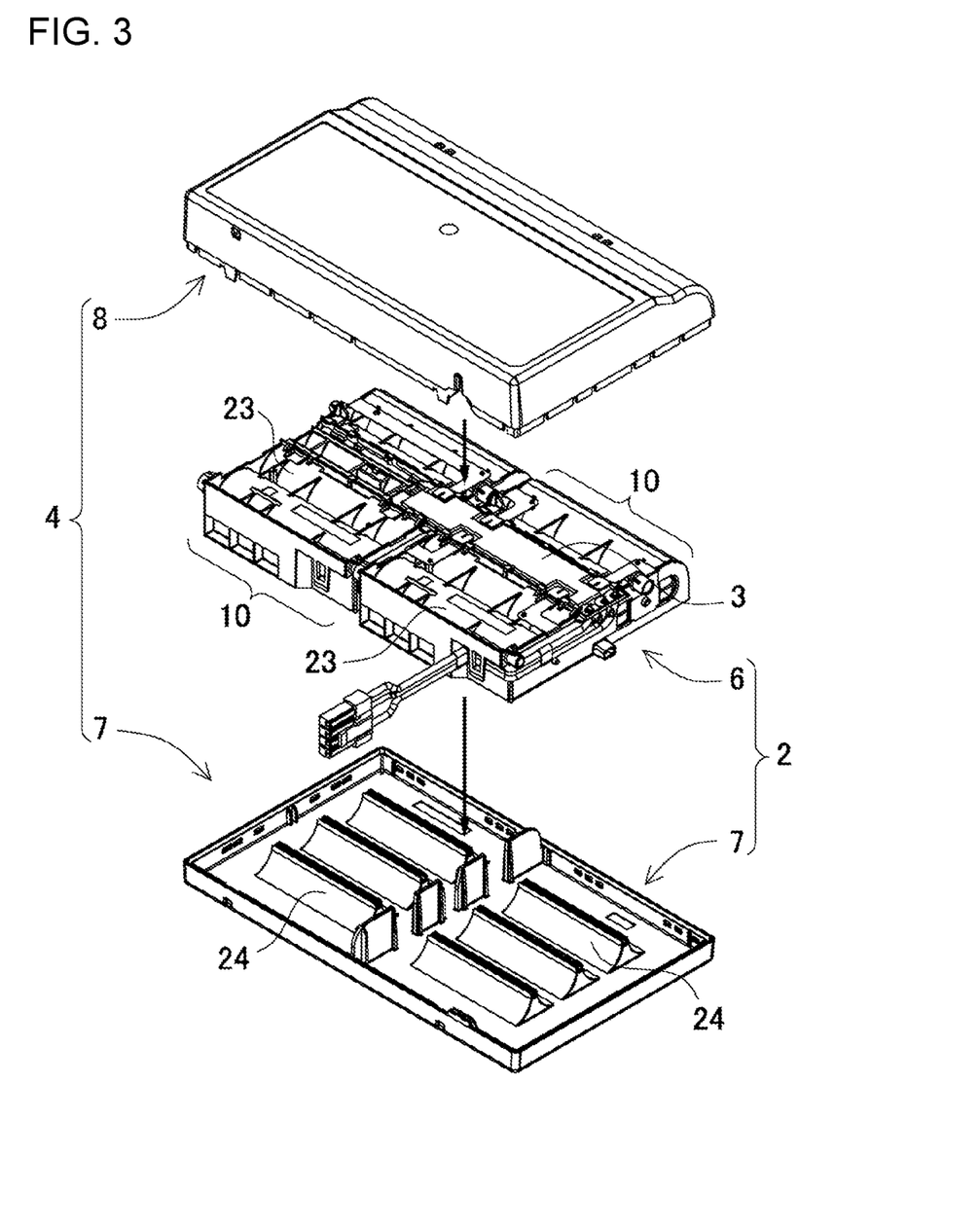
FIG. 3 is an exploded perspective view of the battery pack illustrated in FIG. 1.
Figure 4:
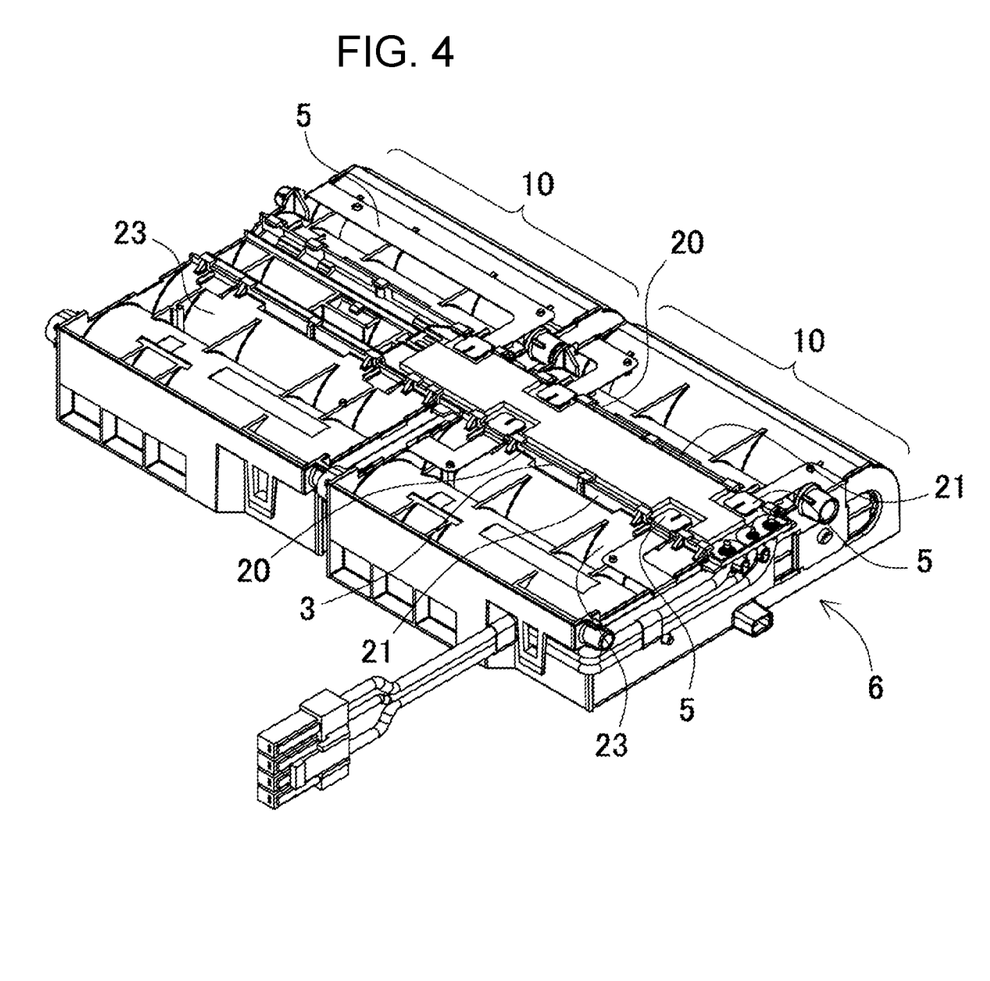
FIG. 4 is a perspective view of a battery block of the battery pack illustrated in FIG. 3.

Battery holder 2 is made of insulating plastic, and includes a cylindrical storage unit into which cylindrical battery 1A is inserted and disposed at a predetermined position. Battery holder 2 in the drawings includes first battery holder 6 and second battery holder 7 dividably coupled to both surfaces of cylindrical battery 1A. First battery holder 6 and second battery holder 7 are separately molded from plastic as an insulating material. First battery holder 6 and second battery holder 7 are coupled to each other with cylindrical battery 1A arranged inside, and battery 1 is arranged at a predetermined position. As illustrated in FIG. 2, first battery holder 6 and second battery holder 7 are coupled to each other at predetermined positions with opposing surfaces of the holders contacting each other as a fitting structure. Battery holder 2 holds cylindrical batteries 1A at predetermined positions while first battery holder 6 and second battery holder 7 are coupled to each other.

In battery pack 100 illustrated in FIGS. 2 to 8, circuit board 3 is coupled to a surface of first battery holder 6. First battery holder 6 includes corrugated surface plate 23 on which cylindrical batteries 1A are parallel to one another on a single plane in a parallel form. Circuit board 3 is disposed on an outer surface of corrugated surface plate 23. First battery holder 6 and second battery holder 7 have inner surfaces formed into corrugations along a surface of cylindrical battery 1A. Cylindrical batteries 1A are arranged parallel to one another side by side on the single plane. In battery pack 100 of FIGS. 2 and 3, second battery holder 7 is also used as exterior case 4. In battery pack 100, exterior case 4 includes cover case 8 and second battery holder 7. Cover case 8 is coupled to second battery holder 7, and first battery holder 6 is arranged inside. In second battery holder 7, holding rib 24 for arranging cylindrical batteries 1A at predetermined positions is unitarily molded on the inner surface of second battery holder 7. First battery holder 6 is coupled to hold cylindrical batteries 1A at predetermined positions.

Lead Plate 5

Figure 7:
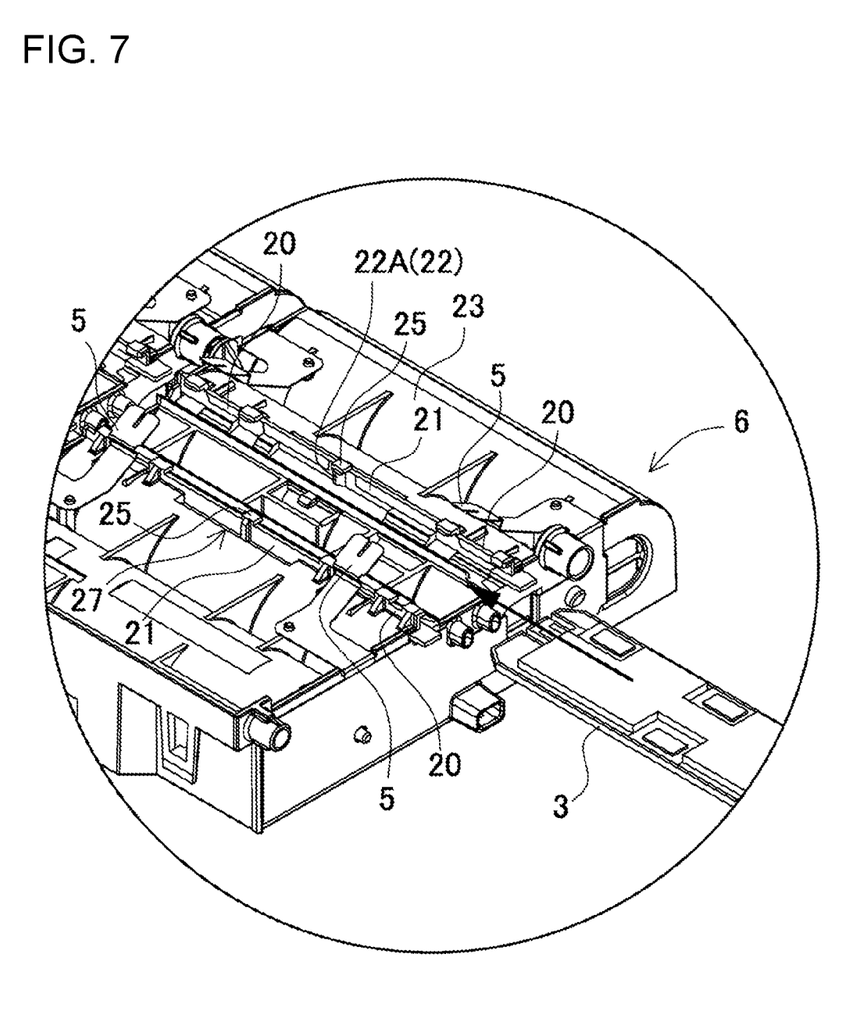
FIG. 7 is an enlarged perspective view of the battery pack for illustrating a state in which the circuit board is set in the battery holder.
Figure 8:
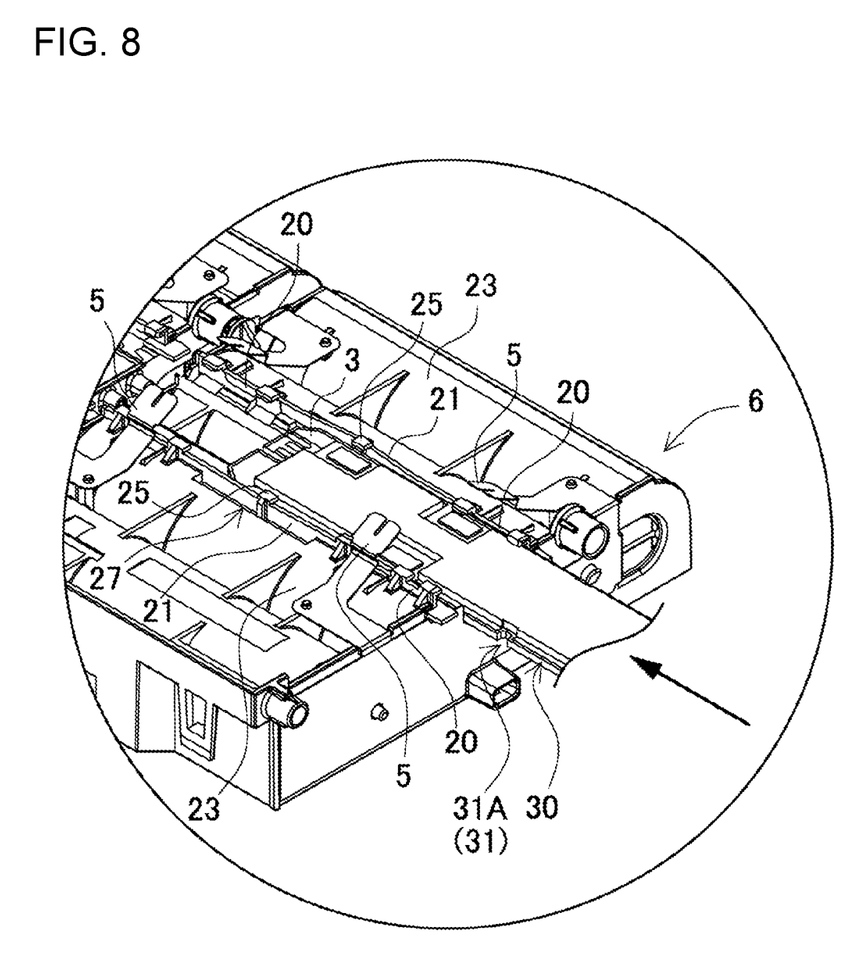
FIG. 8 is an enlarged perspective view of the battery pack for illustrating a state in which the circuit board is set in the battery holder.

In battery 1 disposed at a predetermined position while being sandwiched between first battery holder 6 and second battery holder 7, lead plates 5 are coupled to electrodes at both ends by, e.g. a spot welding. Lead plates 5 connect batteries 1 in parallel or series to one another. An electrode of battery 1 on an output side of battery block 10 is connected to one end of lead plate 5 connected to circuit board 3. Lead plate 5 is drawn from battery holder 2 to the outside, and is connected to a surface of circuit board 3 by, e.g. a spot welding to connect battery block 10 to circuit board 3. Lead plate 5 drawn from battery block 10 is bent outward as illustrated in FIGS. 7 and 8 while circuit board 3 is inserted. Circuit board 3 is disposed at a predetermined position on first battery holder 6, and lead plate 5 is connected by, e.g. a spot welding while pressing a tip of lead plate 5 against circuit board 3.

Circuit Board 3

In battery pack 100, circuit board 3 is fixed to the surfaces of two battery blocks 10 coupled in series to each other. In battery pack 100, circuit board 3 is coupled to the surface of first battery holder 6. In battery block 10, batteries 1 (four batteries 1 in FIG. 2) are arranged on the single plane, but circuit board 3 is arranged on the surface of battery block 10 and parallel to the plane on which batteries 1 are arranged. Circuit board 3 has an elongated shape slenderly extended in a longitudinal direction of two battery blocks 10, and is arranged in bridging over the surfaces of first battery holders 6 of two battery blocks 10 to couple two battery blocks 10 to each other.

Circuit board 3 shown in FIGS. 5 to 8 has a rectangular plate shape with slidable side edges 30 parallel to each other at both sides of the board. First locking portion 31 is provided on each of slidable side edges 30 on the both sides of the board. First locking portion 31 is locked to second locking portion 22 provided on battery holder 2 to locate circuit board 3 at a predetermined position on battery holder 2. In circuit board 3 in the drawings, one first locking portion 31 is provided substantially at a center of slidable side edge 30, but plural first locking portions may be provided at the slidable side edge.

Insertion Guide 20

First battery holder 6 including second locking portion 22 includes insertion guide 20 specifying an insertion direction of circuit board 3 in order to dispose circuit board 3 at a predetermined position. In battery pack 100 shown in FIGS. 4 to 8, two insertion guides 20 are provided along slidable side edges 30 of inserted circuit board 3 such that circuit board 3 is inserted in the longitudinal direction of two battery blocks 10 coupled in series to each other. Circuit board 3 is guided between two insertion guides 20 and inserted in the longitudinal direction of battery block 10. Insertion guides 20 are vertical walls extending along both sides of circuit board 3 to be inserted, and are arranged at positions facing slidable side edges 30 of circuit board 3. Insertion guide 20 is locally provided with retaining piece 25 at an upper end edge such that circuit board 3 inserted is not pulled off. Insertion guide 20 shown in FIG. 2 is provided with a slight gap (for example, 0.5 mm to 2 mm) from slidable side edge 30 of circuit board 3 allowing circuit board 3 to smoothly move in the insertion direction.

In first battery holder 6 shown in FIGS. 2 and 5 to 8, two insertion guides 20 are provided on an outer surface of corrugated surface plate 23. Circuit board 3 is inserted between two insertion guides 20. In first battery holder 6, the outer surface of corrugated surface plate 23 includes plural (four in the drawings) of rounded ridges 26 as a corrugated shape along surfaces of cylindrical batteries 1A. Rounded ridge 26 has a cross-sectional shape semicircular along the surface of cylindrical battery 1A, and cylindrical battery 1A is arranged on an inner surface. Each of two insertion guides 20 are implemented by vertical walls extending along a peak portion of respective one of different rounded ridges 26, that is, along the peak portion of respective one of two adjacent rounded ridges 26 in the drawings among the plural rounded ridges 26. Circuit board 3 inserted between two insertion guides 20 is guided by a surface of corrugated surface plate 23, an inner surface of the vertical wall that is insertion guide 20, and a lower surface of retaining piece 25, and is inserted into the surface of first battery holder 6. In first battery holder 6, cylindrical battery 1A is arranged inside rounded ridge 26 provided on corrugated surface plate 23. In other words, corrugated surface plate 23 has an inner surface with a shape along the surface of cylindrical battery 1A, and rounded ridges 26 is provided on the surface. Cylindrical battery 1A is thus disposed between rounded ridges 26.

Elastic Extension 21

Figure 9:
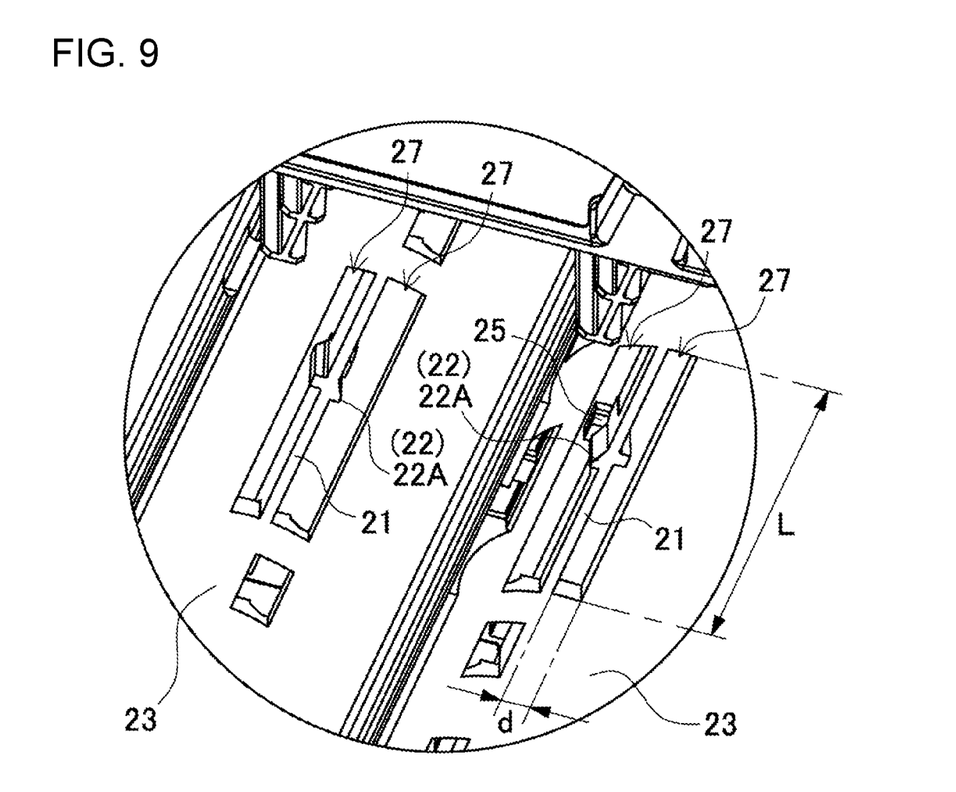
FIG. 9 is an enlarged bottom perspective view of a main part of a first battery holder.

The vertical wall provided on first battery holder 6 and constituting insertion guide 20 includes a center portion functioning as elastic extension 21. As illustrated in FIGS. 7 to 9, both ends of elastic extension 21 are coupled to battery holder 2. Each of elastic extensions 21 are elastically deformable with slits 27 on both sides thereof. Elastic extension 21 elastically deforms to have an arcuate shape while circuit board 3 is inserted. The vertical walls of insertion guides 20 are provided on first battery holder 6 to have an arcuate elastically deformable shape with slits 27 opening on both sides thereof. Insertion guide 20 and elastic extension 21 are constituted by a vertical wall extending linearly, and are arranged at a position facing slidable side edge 30 of circuit board 3. Elastic extension 21 includes locking protrusion 22A as second locking portion 22 guided to locking recess 31A that is first locking portion 31 provided on slidable side edge 30 such that circuit board 3 inserted into insertion guide 20 is not pulled out.

In first battery holder 6 shown in the drawings, circuit board 3 is arranged on the surface of corrugated surface plate 23 having plural rounded ridges 26 on the outer surface of the plate. The pair of elastic extensions 21 holding both sides of circuit board 3 is arranged along the peak portions of different rounded ridges 26 parallel with each other, that is, the peak portions of adjacent rounded ridges 26 in the drawings. Since circuit board 3 arranged at this position is arranged at a position covering valley portion 28 between rounded ridges 26, a wide gap is formed between valley portion 28 as a back surface and the surface of battery holder 2. Thus, circuit board 3 having a protruding portion on the back surface may be arranged. In first battery holder 6 shown in the drawings, since insertion guides 20 and elastic extensions 21 are arranged by providing the vertical walls on the peak portions of adjacent rounded ridges 26, the lateral width of circuit board 3 is the interval between the peak portions of rounded ridges 26. Battery holder 2 may change in the width direction of circuit board 3 of rounded ridges 26 in which the peak portions are provided, and circuit board 3 having a large lateral width arranged at a predetermined position can be arranged at the predetermined position.

Since the both ends of elastic extension 21 shown in FIGS. 5 to 9 are coupled to battery holder 2, the elastic extension elastically deforms to have an arcuate shape while circuit board 3 is being inserted, but is stably restored to have the original linear shape while locking protrusion 22A is guided to locking recess 31A of circuit board 3. Length of slit 27 determines the entire length of elastic extension 21, and the lateral width of slit 27 determines the amount of displacement by which elastic extension 21 is elastically deformable. Elastic extension 21 smoothly deforms by lengthening slit 27 to enhance restorability. Long elastic extension 21 can be arranged at a predetermined position so as to reliably and stably prevent circuit board 3 from coming off by increasing the protrusion amount of locking protrusion 22A. For this reason, total length (L) of elastic extension 21, that is, the length of slit 27 is, for example, 1 cm or more, preferably 2 cm or more, and optimally 3 cm or more. Lateral width (d) of slit 27 is specified in consideration of protruding height (t) of locking protrusion 22A provided in elastic extension 21, that is, from the displacement amount of elastic extension 21 in a state where circuit board 3 is inserted, and is set to be larger than protruding height (t) of locking protrusion 22A.

Figure 5:
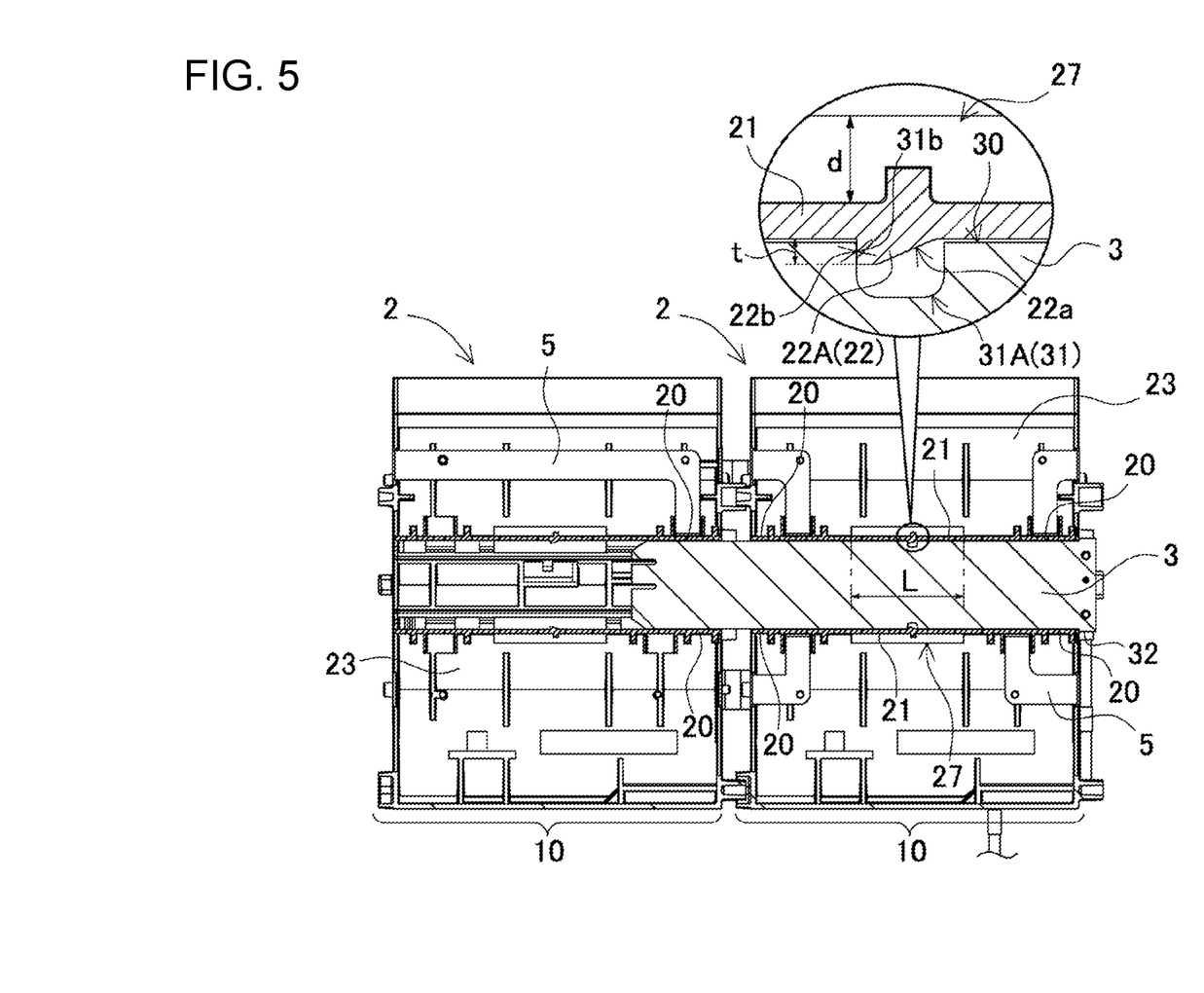
FIG. 5 is a horizontal cross-sectional view of the battery pack for illustrating a state in which a circuit board is set in a battery holder.
Figure 6:
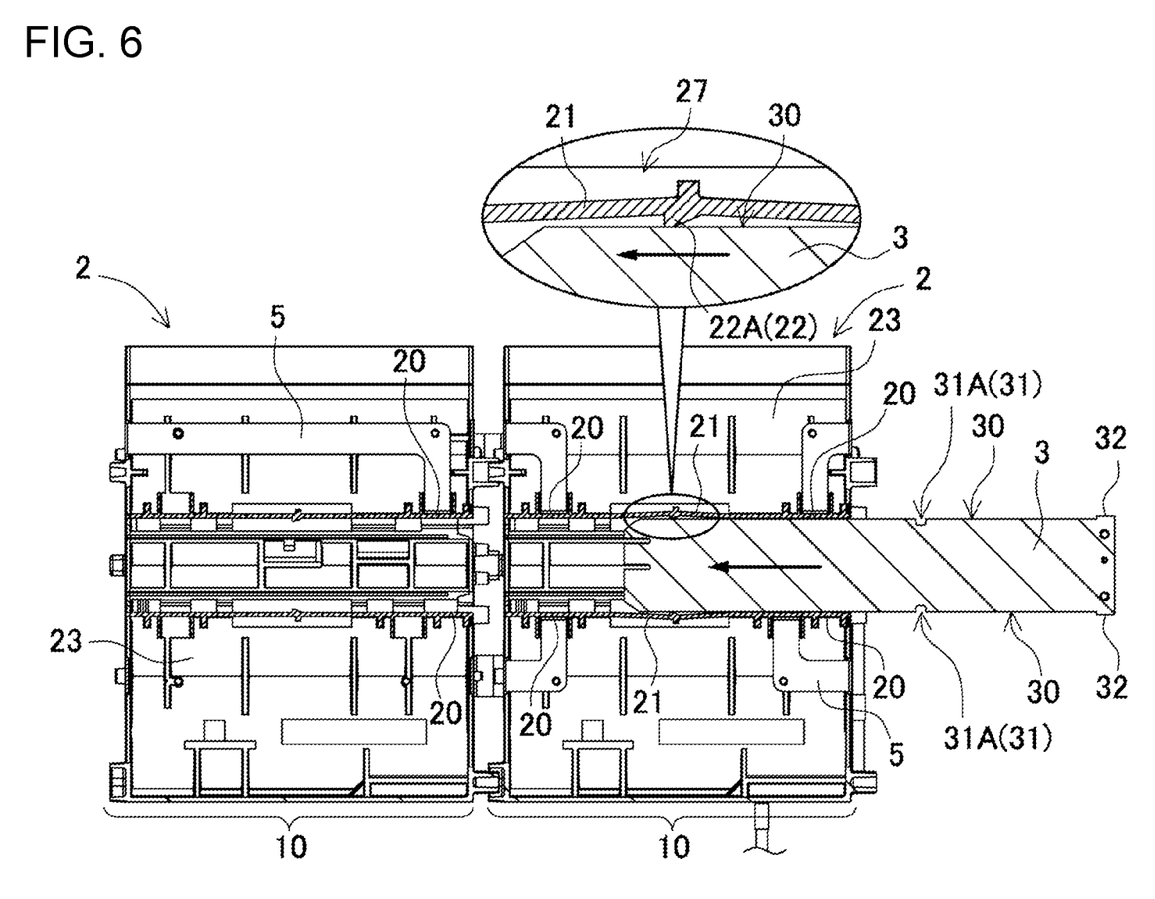
FIG. 6 is a horizontal cross-sectional view of the battery pack for illustrating a state in which the circuit board is set in the battery holder.

Locking protrusion 22A in FIG. 5 has a right triangular shape or a trapezoidal shape, and has inclined surface 22a in which a portion on the inclined surface approaches slidable side edge 30 as the portion shifting in the insertion direction of circuit board 3. Locking recess 31A and locking protrusion 22A illustrated in the drawings has surfaces contacting each other in a pull-out direction of circuit board 3 as vertical surfaces 22b and 31b perpendicular to the pull-out direction. This locking structure allows circuit board 3 to be inserted at a predetermined position while being smoothly inserted, and circuit board 3 is reliably prevented from being pulled out in a state where locking protrusion 22A is guided to locking recess 31A. In the locking structure described above, locking recess 31A and locking protrusion 22A reliably prevent the movement in the direction in which circuit board 3 is pulled off. In order to prevent positional displacement of circuit board 3 inserted at the predetermined position in the insertion direction, circuit board 3 shown in FIGS. 5 and 6 includes stopper protrusion 32 with a flange shape protruding on both sides at the rear end of slidable side edge 30. Stopper protrusion 32 hits the end surface of battery holder 2 and prevents circuit board 3 from moving in the insertion direction.

As illustrated in FIG. 9, first battery holder 6 has slits 27 therein on both sides of the vertical wall and elastic extension 21 having locking protrusion 22A, and has the slit-shaped opening portion provided around retaining piece 25 of insertion guide 20. First battery holder 6 is efficiently mass-produced with a pair of molds without using a complicated mold. This is because plastic can be molded by a pair of molds to mold insertion guide 20 having elastic extension 21 and retaining piece 25 with battery holder 2 in an integrated structure.

INDUSTRIAL APPLICABILITY

A battery pack according to the present invention may be effectively used as a power source for various cordless devices.

REFERENCE MARKS IN THE DRAWINGS 100 battery pack
1 battery
1A cylindrical battery
2 battery holder
3 circuit board
4 exterior case
5 lead plate
6 first battery holder
7 second battery holder
8 cover case
10 battery block
20 insertion guide
21 elastic extension
22 second locking portion
22A locking protrusion
22a inclined surface
22b vertical surface
23 corrugated surface plate
24 holding rib
25 retaining piece
26 rounded ridge
27 slit
28 valley portion
30 slidable side edge
31 first locking portion
31A locking recess
31b vertical surface
32 stopper protrusion

The invention claimed is:
1. A battery pack comprising:
a battery holder including a plurality of batteries arranged at predetermined positions; and
a circuit board connected to the plurality of batteries and arranged at a predetermined position on the battery holder, wherein
the circuit board has a plate shape having slidable side edges parallel to each other at both sides of the circuit board,
each of the slidable side edges of the circuit board includes a first locking portion,
the battery holder includes:
insertion guides allowing the circuit board to move along the slidable side edges of the circuit board; and
a pair of elastic extensions extended and disposed on the both sides of the circuit board inserted into the insertion guides,
each of the elastic extensions includes a second locking portion, the second locking portion is locked by respective one of the first locking portions so as to lock the circuit board at the predetermined position,
one of the respective one of the first locking portions and the each of the second locking portions is a locking recess, and another of the respective one of the first locking portions and the each of the second locking portions is a locking protrusion,
the respective one of the first locking portions locks the each of the second locking portions to hold the circuit board at the predetermined position on the battery holder while the circuit board is inserted into the insertion guide,
the each of the elastic extensions has an elongated shape extended in an insertion direction of the circuit board,
both ends of the each of the elastic extensions are coupled to the battery holder,
the each of the elastic extensions has the respective one of the first locking portions at an intermediate portion of the each of the elastic extensions, and
the battery holder has two slits therein extended parallel to each other, and the each of the elastic extensions is provided between the two slits.
2. The battery pack according to claim 1, wherein
the respective one of the first locking portions is the locking recess,
the each of the second locking portions is the locking protrusion, and
the locking protrusion has an inclined surface such that a portion of the inclined surface approaches the slidable side edges of the circuit board as the portion of the inclined surface shifts in the insertion direction of the circuit board.
3. The battery pack according to claim 2, wherein the locking recess and the locking protrusion have respective surfaces contacting each other in a pull-out direction of the circuit board, the respective surfaces of the locking recess and the locking protrusion being perpendicular to the pull-out direction.
4. The battery pack according to claim 1, wherein
the plurality of batteries are cylindrical batteries,
the battery holder includes a corrugated surface plate allowing the cylindrical batteries to arranged parallel to one another in a single plane, and
the circuit board is arranged on an outer surface of the corrugated surface plate.
5. The battery pack according to claim 4, wherein the elastic extensions are coupled unitarily to the corrugated surface plate.

6. The battery pack according to claim 5, wherein
the corrugated surface plate includes a plurality of rounded ridges protruding on the outer surface of the corrugated surface plate,
each of the pair of elastic extensions disposed at the both sides of the circuit board are arranged along a peak portion of respective one of the rounded ridges different from each other, and
the circuit board is arranged at a position covering a valley portion between the rounded ridges.

7. The battery pack according to claim 6, wherein
the each of the elastic extensions is arranged along the peak portions of the respective one of the rounded ridges of the corrugated surface plate, and
the corrugated surface plate has slits provided therein, the slits being provided at both sides of the each of the elastic extensions.

8. The battery pack according to claim 1, wherein the battery pack is a power source configured to be attached to an electric device including a motor.

9. The battery pack according to claim 8, wherein the battery pack is a power source configured to be attached to a vacuum cleaner.

10. The battery pack according to claim 9, wherein the battery pack is a power source configured to be attached to a self-traveling vacuum cleaner.

11. A battery pack comprising:
a battery holder including a plurality of batteries arranged at predetermined positions; and
a circuit board connected to the plurality of batteries and arranged at a predetermined position on the battery holder, wherein
the circuit board has a plate shape having slidable side edges parallel to each other at both sides of the circuit board,
each of the slidable side edges of the circuit board includes a first locking portion,
the battery holder includes:
insertion guides allowing the circuit board to move along the slidable side edges of the circuit board; and
a pair of elastic extensions extended and disposed on the both sides of the circuit board inserted into the insertion guides,
each of the elastic extensions includes a second locking portion, the second locking portion is locked by respective one of the first locking portions so as to lock the circuit board at the predetermined position,
one of the respective one of the first locking portions and the each of the second locking portions is a locking recess, and another of the respective one of the first locking portions and the each of the second locking portions is a locking protrusion,
the respective one of the first locking portions locks the each of the second locking portions to hold the circuit board at the predetermined position on the battery holder while the circuit board is inserted into the insertion guide,
the plurality of batteries are cylindrical batteries,
the battery holder includes a corrugated surface plate allowing the cylindrical batteries to arranged parallel to one another in a single plane, and
the circuit board is arranged on an outer surface of the corrugated surface plate,
the elastic extensions are coupled unitarily to the corrugated surface plate,
the corrugated surface plate includes a plurality of rounded ridges protruding on the outer surface of the corrugated surface plate,
each of the pair of elastic extensions disposed at the both sides of the circuit board are arranged along a peak portion of respective one of the rounded ridges different from each other,
the circuit board is arranged at a position covering a valley portion between the rounded ridges,
the each of the elastic extensions is arranged along the peak portions of the respective one of the rounded ridges of the corrugated surface plate, and
the corrugated surface plate has slits provided therein, the slits being provided at both sides of the each of the elastic extensions.

12. The battery pack according to claim 11, wherein
the respective one of the first locking portions is the locking recess,
the each of the second locking portions is the locking protrusion, and
the locking protrusion has an inclined surface such that a portion of the inclined surface approaches the slidable side edges of the circuit board as the portion of the inclined surface shifts in the insertion direction of the circuit board.

13. The battery pack according to claim 12, wherein the locking recess and the locking protrusion have respective surfaces contacting each other in a pull-out direction of the circuit board, the respective surfaces of the locking recess and the locking protrusion being perpendicular to the pull-out direction.

14. The battery pack according to claim 11, wherein the battery pack is a power source configured to be attached to an electric device including a motor.

15. The battery pack according to claim 14, wherein the battery pack is a power source configured to be attached to a vacuum cleaner.

16. The battery pack according to claim 15, wherein the battery pack is a power source configured to be attached to a self-traveling vacuum cleaner.

* * * * *